FREQUENCY CONTROL OF HIGH-FREQUENCY OSCILLATIONS

Original Filed Feb. 6, 1945 2 Sheets-Sheet 1

INVENTOR
LELAND E. THOMPSON
BY Sarry Tonide
ATTORNEY

FREQUENCY CONTROL OF HIGH-FREQUENCY OSCILLATIONS

Original Filed Feb. 6, 1945 2 Sheets-Sheet 2

INVENTOR
LELAND E. THOMPSON
BY Harry Tonick
ATTORNEY

Patented Nov. 14, 1950

2,529,579

UNITED STATES PATENT OFFICE 2,529,579

FREQUENCY CONTROL OF HIGH-FREQUENCY OSCILLATIONS

Leland E. Thompson, Merchantville, N. J., assignor to Radio Corporation of America, a corporation of Delaware Original applications February 6, 1945, Serial No. 576,453, and March 15, 1946, Serial No. 654,553. Divided and this application January 29, 1948, Serial No. 5,013

4 Claims. (Cl. 250—36)

This is a division of my co-pending application Serial Number 576,453, filed February 6, 1945, Patent No. 2,514,425, entitled Radio Relaying. This application is also a division of my application Serial Number 654,553, filed March 15, 1946, Patent No. 2,476,162.

In my co-pending parent application referred to, I have described an ultra short wave radio relaying system making use of an ultra short wave oscillation generator. This oscillation generator is of the type making use of a cavity resonator having a gap, oscillations being produced in the resonator by an electron discharge system including a negatively charged anode, a positively charged grid and a cathode.

The object of my present invention is to provide circuits for automatically frequency controlling this type of oscillator, particularly when employed as a heterodyning oscillator. Other objects, advantages and features will appear with the more detailed description of my present invention.

Figure 1:
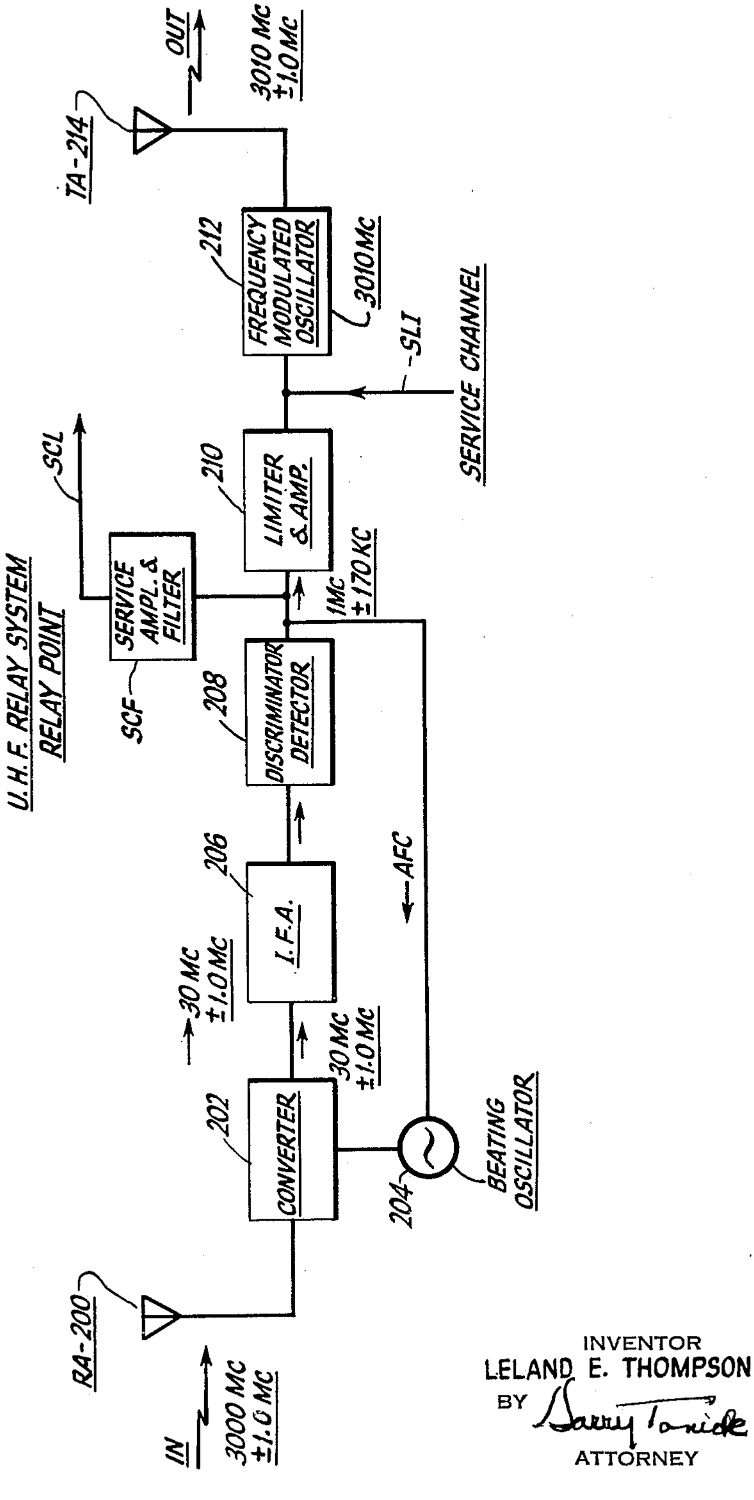
Figure 2:
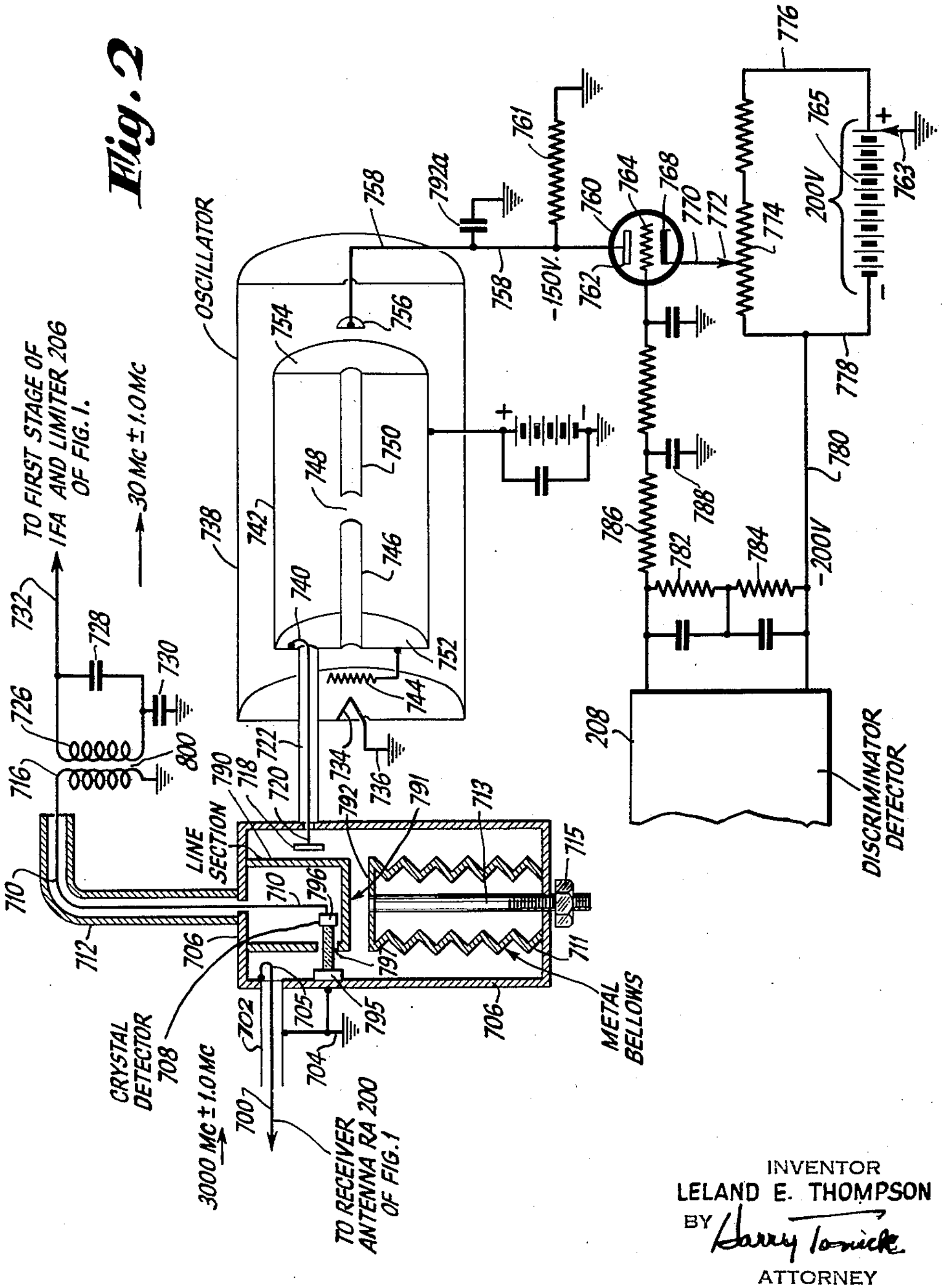

In the drawings, Fig. 1 is a block diagram of a radio relay station as described in my parent application, and Fig. 2 illustrates certain circuit details of Fig. 1.

Referring to Fig. 1 in general terms, the received waves (which are doubly frequency modulated at the remote transmitter, not shown) are converted to a suitable intermediate frequency, amplified, and then subjected to a single frequency demodulation. The waves resulting from this single frequency demodulation are then used in part for purposes of automatic frequency control of the local beating oscillator and to frequency modulate a new locally generated carrier. The waves received by Fig. 1 may, for example, emanate from a transmitter wherein a carrier having a mean frequency of 3000 megacycles is frequency modulated plus and minus 1.0 megacycle for maximum deviation.

More specifically referring to Fig. 1, the waves are picked up or received on a receiving antenna RA200. The received waves are beat down in frequency in a converter circuit 202 with waves from a local beating oscillator 204. The intermediate frequency produced may be 30 megacycles plus and minus 1.0 megacycle. The waves of intermediate frequency are amplified in an intermediate frequency amplifier 206 and then fed to a discriminator detector 208.

The action of the discriminator detector is such as to produce a wave of one megacycle plus and minus 170 kilocycles as explained in my parent application. This wave is limited and amplified in appropriate apparatus 210 and then used to frequency modulate oscillator 212 whose unmodulated frequency may be 3010 megacycles.

As indicated in Fig. 1 the service channel band may be filtered out by filter SCF and taken from line SCL for use in earphones, or the output of line SCL may be fed by patch cords to the service line input SLI to modulate oscillator 212.

By adjusting the amplitude of the output of amplifier 210 the waves radiated over the transmitting antenna TA214 of the relay point of Fig. 1 may be made 3010 megacycles plus and minus 1.0 megacycle.

All values of frequencies, resistances, voltages, etc. are given as illustrative or typical only and, therefore, it is to be clearly understood that all inventions described herein with reference to all figures of the drawings are not to be restricted to such values.

Fig. 2 illustrates in greater detail the beating oscillator-converter apparatus designated schematically at 202 and 204 in Fig. 1. That is, the receiving antenna RA200 of Fig. 1 is connected to the transmission line 700 of Fig. 2. Line 700 is provided with an external metallic shield 702, grounded at 704. Also, transmission line 700 is terminated by an inductive loop 705, thereby establishing coupling within the re-entrant type cavity resonator 706. If desired, transmission line 700, 702 may be replaced by a wave chute or guide.

The cavity resonator 706 is of metal and cylindrical in shape. Extending within the resonator 706 and connected to one of its bases is cylindrical line section 790 whose base 791 is adjacent and spaced from the metal circular base 792 carried by metal bellows 711. The line section 790 is tuned by means of this cylindrical metallic bellows 711 having, as indicated, springy corrugated side walls. By means of the bolt 713 and nut 715, the capacity between plates 791 and 792 is adjusted as is also the volume or internal cubical content of the resonator. Preferably the line section 790 is approximately one-quarter wavelength long—here about ¾ of one inch. This line section is tuned by adjustment of plate 792 to the frequency of the waves received and fed in at 705. A crystal detector 708 is mounted as shown with one terminal 795 in electrical contact with metallic wall 706 and its other terminal 796 protruding through opening 797 in the cylindrical line section 790. Terminal 796 is connected to conductor or line 710. As a result, the crystal detector rectifies the waves fed in by probes 705 and 718 and feeds the resulting difference frequency of about 30 mc. into line 710.

The cavity resonator 706 is also supplied with high frequency oscillations by means of a capacity end plate 718 fixed to an exposed section of transmission line 720 protruding within the resonator. The line 720 is excited by an automatically frequency controlled high frequency oscillator operating in the neighborhood of either 3030 megacycles or 2070 megacycles. The oscillator will be described more fully later.

The beat frequency is fed through line 710 shielded by the external conductor 712 to the primary 716 of a transformer 800 whose secondary coil 726 is tuned by condenser 728. The output of the tuned circuit 726, 728 is fed through line 732 to the first stage of the intermediate frequency amplifiers and limiters 206 of Fig. 1.

In Fig. 2 the oscillator comprises an evacuated container 738, a cathode 734 grounded at 736, a negatively biased plate 756, a positively charged cavity resonator 742 and a grid 744 connected to the resonator. The resonator 742, shown in cross section, is cylindrical in shape and is made of metal. The resonator has metallic bases 752, 754 which are perforated and to which are attached the hollow metallic tubes 746, 750. The tubes 746, 750 are separated at an intermediate point so as to provide a gap 748. As explained in my parent application, oscillations are set up in the cavity resonator 742 of Fig. 2 and wave output is derived from the inductive loop 740 coupled to the space within the cavity resonator 742.

The external surface of the cavity resonator 706 is grounded at 704 as indicated.

By properly choosing the dimensions of the cavity resonator 742 and by appropriate adjustment of the voltages on the elements of the oscillator, oscillation at a desired frequency may be had. By suitable external means the shape of resonator 742 may be warped so as to change its cubical content and, hence, its frequency of operation. Or, if desired, a metallic bellows adjustment, such as that provided for the cavity resonator 706 may be provided for 742, but in this case, of course, the container 738 should be hermetically sealed to resonator 742 so that a portion of its external surface containing and otherwise supporting the metallic bellows structure would be exposed for external adjustment.

The output appearing in the tuned circuit 726, 728 would be, for the example chosen, a wave as indicated in Fig. 1 having a mean frequency of 30 megacycles and maximum frequency deviation of ±1.0 megacycle. This wave is fed to the intermediate frequency amplifying, limiting and discriminating detector stages.

The discriminator detector of Fig. 1 is also diagrammatically illustrated at 208 in Fig. 2 across the output terminals of which are connected resistors 782, 784, which provide automatic frequency controlling voltages. These voltages may then be used to control the frequency of oscillator 738 so as to maintain the beat frequency waves within the pass band of intermediate frequency amplifying and limiting stages 206 of Fig. 1.

The frequency controlling circuit for the oscillator 738, from which the automatic frequency controlling voltages are derived, is illustrated schematically in Fig. 2 in connection with vacuum tube 760. More specifically, a source of voltage 765 is connected across the leads or terminals 776, 778 and these terminals are connected to a potentiometer 774. By properly adjusting the tap 772 on potentiometer 774, and by proper choice of values for other circuit elements, the current flow through, or the conductivity of tube 760, having the anode 762, grid 764, and the cathode 768, may be controlled so that the voltage applied through lead 758 upon the plate 756 is of a desired value, such as, for example, —150 volts. As indicated, the plate circuit for tube 760 is returned to ground through a resistor 761 shunted by condenser 792*a* and through the ground connection 763 to the source of potentials 765. It should, therefore, be clear that the automatic frequency controlling voltages appearing across resistors 782 and 784 will vary the current flow through the tube 760 and hence its effective resistance. Consequently, the voltage in lead 758 will vary in such a way as to control the oscillator in that direction which will bring the beat frequencies appearing in 726, 728 back to the desired intermediate frequency pass band of the IFA system 206 of Fig. 1.

What is claimed is:

1. A control circuit for an oscillation generator, said oscillation generator comprising a container containing an electron emitting cathode and an anode, a cavity resonator having a gap, means including one or more sources of unidirectional potential for maintaining said resonator at a positive potential with respect to said cathode and said anode at a negative potential with respect to said cathode, said control circuit comprising a vacuum tube having a plate conductively connected to the anode of said oscillator, and having a grid, and a cathode, a circuit including a source of potential of said aforesaid means extending from said last cathode to the cathode of said oscillator so arranged as to maintain a negative voltage on the plate of said vacuum tube with respect to the cathode of the oscillation generator, and a circuit for applying controlling voltages to the grid of said vacuum tube to vary the conductivity thereof.

2. Apparatus as claimed in claim 1, characterized by the fact that a resistance is connected between the plate of said vacuum tube and the cathode of said oscillation generator.

3. A control circuit for an oscillation generator, said oscillation generator comprising a container containing an electron emitting cathode and anode, a cavity resonator having a gap, said resonator being maintained at a positive potential with respect to said cathode and said anode being maintained at a negative potential with respect to said cathode, said control circuit comprising a vacuum tube having a plate conductively connected to the anode of said oscillator, said vacuum tube also having a grid and a cathode, a source of unidirectional potential having a potentiometer connected across its terminals, a tap on said potentiometer connected to the cathode of said vacuum tube, connections capable of passing direct current extending from the cathode of said generator and from said source to a point of reference potential, said tap being so chosen and said connections so arranged that the plate of said vacuum tube is continuously maintained at a negative D. C. potential relative to the cathode of said oscillation generator, and a detector circuit connected between said grid and a point on said potentiometer for applying controlling voltages to said grid to thereby vary the conductivity of said vacuum tube.

4. A system as defined in claim 3, characterized in this, that said detector circuit is a frequency discriminator detector.

LELAND E. THOMPSON.

REFERENCES CITED

The following references are of record in the file of this patent:

UNITED STATES PATENTS

| Number | Name | Date |
|---|---|---|
| 2,337,214 | Tunick | Dec. 21, 1943 |
| 2,404,568 | Dow | July 23, 1946 |
| 2,408,817 | Snow | Oct. 8, 1946 |
| 2,409,222 | Morton | Oct. 15, 1946 |
| 2,413,244 | North | Dec. 24, 1946 |
| 2,414,496 | Varian et al. | Jan. 21, 1947 |
| 2,444,073 | Tomlin | June 29, 1948 |